J. D. McKENZIE.
BALING PRESS.
APPLICATION FILED MAY 6, 1911.
1,022,035.
Patented Apr. 2, 1912.
3 SHEETS—SHEET 1.
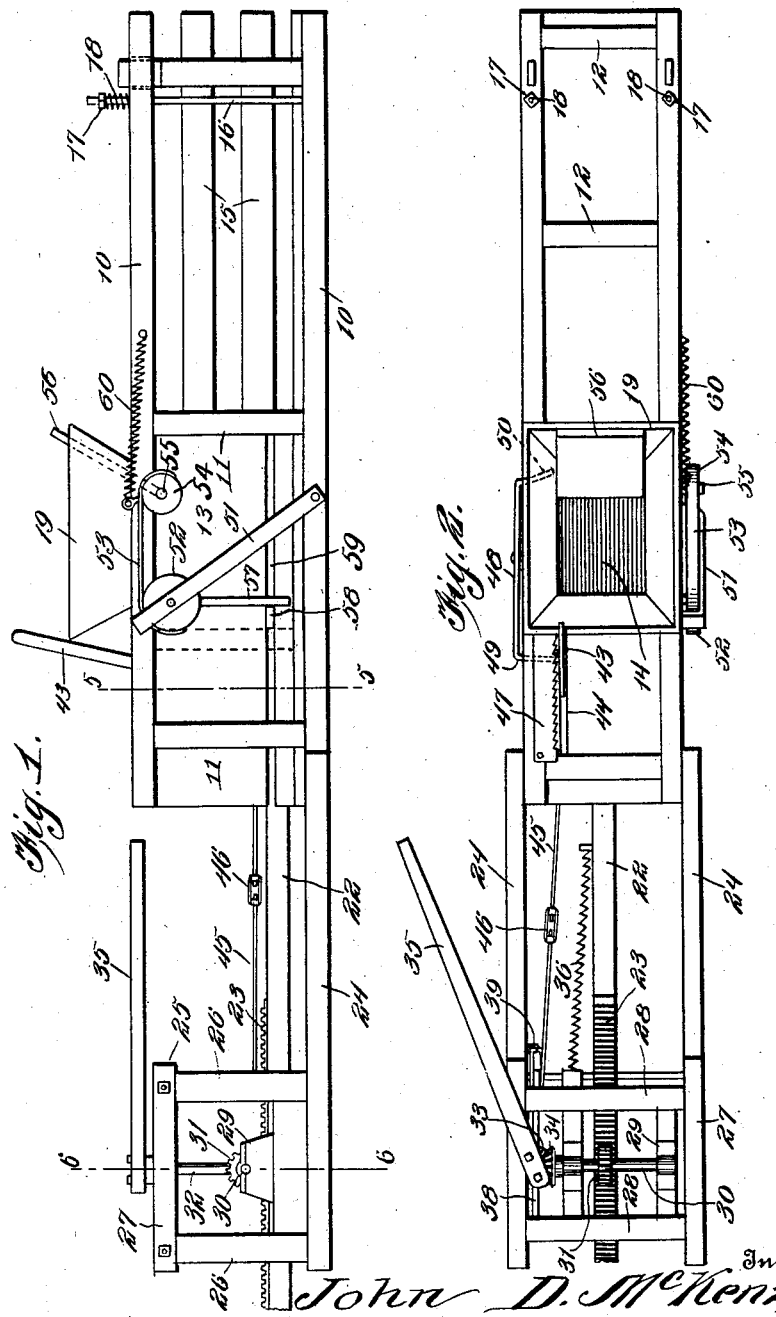
Inventor
John D. McKenzie
Witnesses
By Victor J. Evans
Attorney

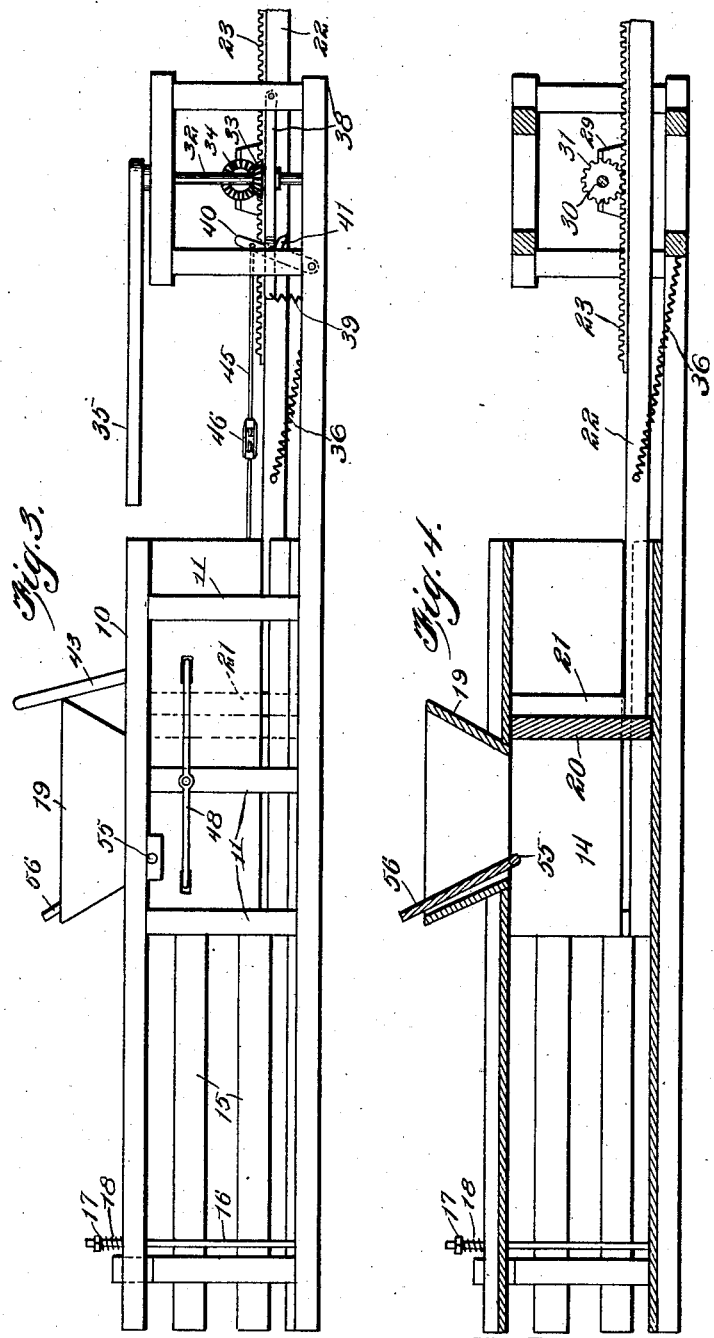

J. D. McKENZIE.
BALING PRESS.
APPLICATION FILED MAY 6, 1911.
1,022,035.
Patented Apr. 2, 1912.
3 SHEETS—SHEET 3.
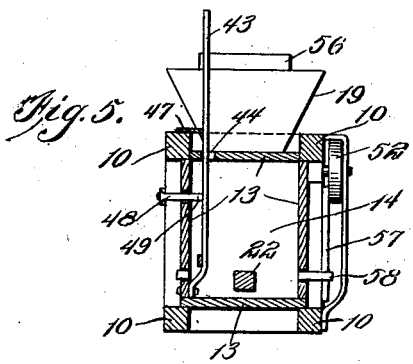
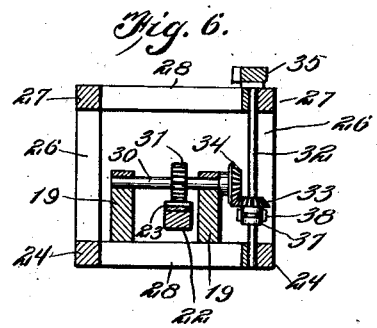
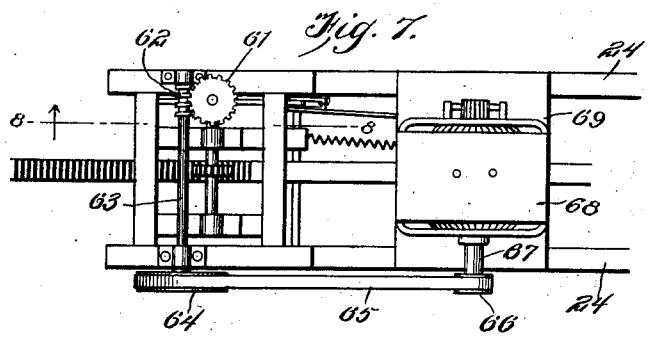
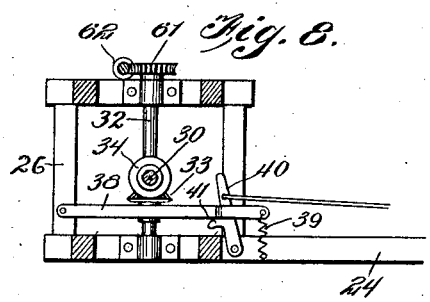

UNITED STATES PATENT OFFICE.

JOHN D. McKENZIE, OF LAUREL, MISSISSIPPI.

BALING-PRESS.

1,022,035.  Specification of Letters Patent.  Patented Apr. 2, 1912.

Application filed May 6, 1911. Serial No. 625,433.

*To all whom it may concern:*

Be it known that I, JOHN D. MCKENZIE, a citizen of the United States, residing at Laurel, in the county of Jones and State of Mississippi, have invented new and useful Improvements in Baling-Presses, of which the following is a specification.

The invention relates to presses, and more particularly to the class of baling presses for baling hay or other material.

The primary object of the invention is the provision of a press of this character in which the plunger element will be normally out of gear for operation, until after the manually controlled lever is set, thereby preventing the movement of the baling element prior to the filling of the press with material to be baled.

Another object of the invention is the provision of a press of this character in which the material delivered thereinto will be condensed, so as to make the bale compact and the material closely baled.

A further object of the invention is the provision of a baling press in which the gear mechanism thereof will be under perfect control, thus avoiding the possibility of injury to an operator on the premature operation of the press, the gear mechanism being actuated by a manually controlled hand lever for the starting and stopping of the press.

A still further object of the invention is the provision of a press in which the feed hopper will be automatically closed or covered on the advancement of the plunger, after hay or other material is fed into the press, thus assuring the proper baling of the material during the operation of the press.

A still further object of the invention is the provision of a press of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a press constructed in accordance with the invention. Fig. 2 is a top plan view thereof. Fig. 3 is a view, looking toward the opposite side of the press. Fig. 4 is a vertical longitudinal sectional view through the press. Fig. 5 is a sectional view on the line 5—5 of Fig. 1. Fig. 6 is a sectional view on the line 6—6 of Fig. 1. Fig. 7 is a fragmentary top plan view of a slight modification of the invention, showing a motor for driving the press. Fig. 8 is a sectional view on the line 8—8 of Fig. 7.

Similar reference characters indicate corresponding parts throughout the several views of the drawings.

Referring to the drawings by numerals, the baling press comprises a main frame, composed of the longitudinal beams 10 connected by suitable standards 11 at various points of their length, and also by the cross bars 12 which extend across the top and bottom of the frame, as shown. At the inner end portion of the frame and secured to the standards 11, on the inner sides of the same, are longitudinal facing boards 13, which form the sides, top and bottom of the baling chamber 14, the boards 13, at the top and bottom of the baling chamber 14, being extended the entire length of the main frame, while on the sides of the latter, throughout the remaining portion thereof, beyond the baling chamber, are slats 15, the same serving as guard rails for the baled material, as it is discharged from the outer delivery end of the press, as usual.

Passed through the longitudinal beams 10, near the outer delivery end of the press, are vertical rods 16, the upper ends of which are threaded and carry adjustable nuts 17, the same working against coiled expansion springs 18, surrounding the said rods 16, the opposite ends of the said springs having their bearing against the top longitudinal beams 10. Thus the delivery end of the press frame will be contracted for compressing the bale delivered therefrom.

Communicating with the baling chamber 14, at the top thereof, is a feed hopper 19, into which is fed material for the introduction of the same in and filling of the baling chamber 14 of the press, as usual. Arranged within the baling chamber 14, in the main frame, is a movable plunger 20 which is adapted to travel upon the upper surface of the bottom of the said baling chamber 14, and is normally retracted therein to lie against abutment strips 21 fixed vertically to the inner faces of the boards 13 at the sides of the main frame. The plunger 20 has fixed thereto a plunger beam 22 provided on its upper edge, for a portion of its length, with a series of rack teeth 23 engaged by means of driving mechanism, as will be hereinafter more fully described.

Secured to the lower longitudinal beams 10 of the main frame, at the inner end thereof, are parallel supplemental longitudinal beams 24, upon which, at their outer ends, is built a supplemental frame 25, composed of spaced vertical posts 26 united at their upper ends by means of side and end bars 27 and 28, respectively, the latter being connected to the posts in any suitable manner to form a rigid supplemental frame structure. Disposed within the bottom of this supplemental frame structure and rising from the bottom thereof, between the vertical posts 26, are longitudinally arranged spaced bearings 29, in which is journaled a horizontal shaft 30, the same having fixed thereto a rack gear 31 meshing with the rack teeth 23 on the plunger beam 22. Thus it will be seen that on the rotation of the shaft 30 in one direction, the plunger will be advanced within the baling chamber 14 in the main frame for the baling of hay or other material confined within said baling chamber.

Journaled in suitable bearings mounted on the bars 27 and the supplemental beams 24 within the supplemental frame are suitable bearings, in which is journaled a vertical shaft 32, on which is slidably keyed a gear 33, the latter being adapted to mesh with a pinion 34, but normally disengaged from the same, the said pinion 34 being fixed to one end of the shaft 30. The upper end of the shaft 32 has fixed thereto a lever arm 35 which, when turned in one direction, will impart rotation to the shaft 32, and through the medium of its gear and pinion connection with the shaft 30, the latter will be caused to rotate, thus advancing the plunger 20 within the baling chamber 14 of the press.

Connected with the plunger beam 22 and the supplemental frame is a coiled retractile spring 36, the latter being adapted to normally sustain the plunger 20 in retracted position within the baling chamber 14 in the main frame of the press. The gear 33 is formed with a grooved hub extension 37, with which is loosely engaged a raising and lowering or shift arm 38, the same being pivoted at one end to one of the vertical posts 26 of the supplemental frame, while its opposite end is connected with a coiled retractile spring 39, suitably fixed to the said supplemental frame, the spring 39 being adapted to retract the arm, so as to hold the slidable gear 33 out of mesh with the pinion 34, thereby normally sustaining the press passive.

Suitably pivoted in the supplemental frame is a cam lever 40 provided with a raising cam 41, the lever, when thrown in one direction, being adapted to lift the arm 38 for the meshing of the gear 33 with the pinion 34 for the starting of the press, the cam lever 40 being operated in a manner as will be hereinafter more fully described.

Mounted within the main frame, at one side of the plunger beam 22 and rearwardly of the normal position of the plunger 20, is a swinging lever 43, the lower end of which is suitably pivoted to the main frame, while its opposite end is passed upwardly through a longitudinally disposed elongated slot 44 formed in the top board 13 of the baling chamber 14, the lever 43 being connected to a pull rod 45 provided with a turn buckle 46, the latter being also connected to a cam lever 40. Thus it will be seen that on moving the lever 43 toward the feed hopper, the gear 33 will be thrown into engagement with the pinion 34, so that upon the turning of the shaft 32, the plunger beam 22 will be advanced for moving the plunger forwardly within the baling chamber 14 for baling purposes. Upon the main frame, at one side of the path of movement of the lever 43, is a toothed plate 47, the lever 43 being adapted for engagement with the teeth on the said plate 47 for sustaining the said lever in adjusted position, until automatically released, as will be hereinafter more fully described.

Fixed to one of the standards 11, on the same side of the main frame with the lever 43, is a spring releasing bar 48, one end thereof being formed with an inturned releasing terminal 49 adapted to act upon the lever 43 when shifted toward the feed hopper 19, so as to automatically release the same, the spring arm 48, at its opposite end, being formed with an inturned trip terminal 50 arranged in the path of movement of the plunger 20, so that when the latter has been advanced in the baling chamber 14, it will operate upon the trip terminal 50, thereby moving the spring arm 48 in position for automatically releasing the lever 43 for the stopping of the press.

Mounted on the main frame, on the side opposite the spring arm 48, is a diagonally disposed bracket 51, upon which is suitably mounted a rotary drum 52, to the outer periphery of which is fixed a band or strap 53, the same being adapted for partially winding on the said drum 52, the opposite end of the band 53 being connected to a pulley 54, the latter being fixed to a transverse shaft 55 journaled in suitable bearings mounted upon the top longitudinal beam 10 of the main frame, the shaft being disposed across the baling chamber 14, at one end of the feed hopper 19. Fixed to the shaft 55 is a tramping board 56, the latter being adapted to compress the material within the baling chamber 14, when swung vertically from normal open position to closing position within the feed hopper 19. Thus it will be seen that when the board 56 is lowered, the same will close communication between the said feed hopper 19 and the baling chamber 14 in the main frame.

Secured within the drum 52 and depending therefrom is an arm 57, the same being disposed in the path of movement of a striking lug 58 projecting outwardly from one side of the plunger 20 through a suitable slot 59, so that on the advancement of the plunger within the baling chamber 14, the tramping board 56 will be automatically swung to position for closing the feed hopper 19 and packing the material within the baling chamber 14.

Connected with the pulley 54 is one end of a retractile spring 60, the opposite end thereof being fixed to the main frame of the press, and this spring 60 is adapted to return the arm 57 to normal position, and simultaneously swing the tramping board 56 to open position, thus permitting the refilling of the baling chamber 14 with material to be subsequently baled within the press.

In Figs. 7 and 8, there is shown a slight modification of the invention, wherein the shaft 32 has fixed to its upper end a worm gear 61, in lieu of the turning lever 35, and with which meshes a worm thread 62 formed on a counter driving shaft 63 suitably journaled upon the supplemental frame, the counter shaft 63 being provided with a band wheel 64, over which is trained an endless belt or band 65, the same being also trained over a band wheel 66 fixed to the driving shaft 67 of a gasolene or electric motor 68, the latter being mounted upon a base 69 fixed to the supplemental longitudinal beams supporting the said supplemental frame, the base 69 being elevated out of the path of movement of the plunger beam 22, so as not to interfere with the movement thereof, during the operation of the press. It is evident that the motor 68 is utilized for operating the press. Of course, if the motor is not used, the press may be operated either by hand or through the medium of horse power, in the ordinary manner.

From the foregoing, taken in connection with the accompanying drawings, it is thought that the construction and operation of the invention will be readily understood, without requiring a more extended explanation.

What is claimed is:

1. The combination with a baling press having a movable plunger, of tramping means operated upon movement of the plunger in one direction, mechanism for driving said plunger, means normally holding said mechanism in inoperative position, and means for moving said last-named means for bringing the said mechanism to operative position and adapted to be released by the plunger when moved a predetermined distance.

2. In a baling press, a main frame having a baling chamber provided with a top opening, a plunger working within said chamber, mechanism for advancing said plunger, manually operated means controlling the first-named mechanism and adapted to be shifted in one position for setting the first-named mechanism for operation, and means operated by the plunger when advanced to effect the automatic release of said second-named means to move the said mechanism to inoperative position.

3. In a baling press, a main frame having a baling chamber provided with a top opening, a plunger working within said chamber, mechanism for advancing said plunger, manually operated means controlling the first-named mechanism and adapted to be shifted in one position for setting the first-named mechanism for operation, means operated by the plunger when advanced to effect the automatic release of said second-named means to move the said mechanism to inoperative position, and a normally raised tramping board mounted on the frame for swinging movement and automatically controlled by the plunger, whereby the said board will be moved into position for closing the top opening of the baling chamber.

4. In a baling press, a main frame having a baling chamber, a plunger movable in said chamber, a feed hopper rising from said frame and communicating with the baling chamber, a tramping board pivoted to the main frame and adapted to be moved into position for closing the communication between the feed hopper and the baling chamber, mechanism operated by the plunger when moving in one direction for swinging said tramping board into position for closing communication between the feed hopper and the baling chamber, means for returning the tramping board to normal position, manually set mechanism for advancing the said plunger, and means controlling said manually set mechanism for automatically releasing the same when the plunger has been moved to a predetermined point within the baling chamber.

In testimony whereof I affix my signature in presence of two witnesses.

JOHN D. McKENZIE.

Witnesses:
J. R. RISHER,
A. McKENZIE.

---

Copies of this patent may be obtained for five cents each, by addressing the "Commissioner of Patents, Washington, D. C."